(12) United States Patent
Epworth

(10) Patent No.: US 6,626,589 B1
(45) Date of Patent: Sep. 30, 2003

(54) OPTICAL PACKET SWITCHING

(75) Inventor: Richard Epworth, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,540

(22) Filed: Dec. 29, 1999

(51) Int. Cl.[7] ................................................ H04J 14/00
(52) U.S. Cl. .......................... 398/54; 398/51; 398/154; 398/202; 398/182; 370/389; 370/392
(58) Field of Search ................................. 359/139, 128, 359/117, 135; 370/389, 392; 398/45, 51, 54, 58, 40, 154, 202, 188, 182

(56) References Cited

U.S. PATENT DOCUMENTS

| | | | | |
|---|---|---|---|---|
| 4,939,721 A | * | 7/1990 | De Bosio | 370/60 |
| 5,253,250 A | * | 10/1993 | Schlafer et al. | 370/60 |
| 5,278,689 A | * | 1/1994 | Gitlin et al. | 359/137 |
| 5,900,957 A | * | 5/1999 | Van Der Tol | 359/139 |

* cited by examiner

*Primary Examiner*—Kinfe-Michael Negash
(74) *Attorney, Agent, or Firm*—Barnes & Thornburg

(57) ABSTRACT

An optical packet is provided with an amplitude modulated (ASK) payload and a differential phase shift keyed (DPSK) header so that a routing address in the header can be read and modified at a network node without having to inject light at this node to do this modification. With ASK, though it is easy to convert a high-level bit to a low-level bit by simple attenuation, the conversion of low-level bit to high-level bit requires light injection. With DPSK, bit conversion can be effected without light injection, merely requiring passage through a phase modulator.

25 Claims, 4 Drawing Sheets

OPTICAL PACKET SWITCHING

BACKGROUND TO THE INVENTION

This invention relates to the field of optical signal processing, and in particular to the processing of packet-based optical signals and to the reading and updating of the routing information and the like contained in such packets, typically in headers of such packets.

The advantages of packet-based optical transmission systems are well known, and the SONET standard is widely accepted as a suitable physical layer for optical transmission systems. Indeed, SONET is one of the many physical layers defined for ATM, which is itself a cell-based (i.e. packet-based) switching and multiplexing technology.

The rapid increase in transmission rates achieved by optical transmission systems far exceeds the capability of electronic processing of signals. Consequently, the limitation to data transfer rates results principally from delays introduced by electrical switching elements. However, these electronic and opto-electronic elements are required for performing switching and routing functions, and the conversion of high-speed optical data to electrical signals for the switching and routing operations is recognised as causing speed reductions.

There have been proposals to provide all-optical networks in which switching and routing take place in the optical domain. Thus U.S. Pat. No. 5,541,756 proposes the use of a packet header with wavelength-coded data, in conjunction with a grating operating as a wavelength differentiator. Different wavelength signals within the optical header are deflected by the grating by different amounts to be incident upon photo-electric sensors positioned at different locations.

In a number of applications it is desirable to be able to change the contents of a header at a switch located at an intermediate position between where an individual packet is first created and its final destination. While effecting such a change in the electric domain is relatively easily accomplished, it is not so easy to accomplish this in the optical domain. A disadvantage of converting the contents of an optical packet (or just its header) into electrical domain, modifying it, and then using a laser/modulator to reconvert it back into the optical domain, involves a number of disadvantages. For instance, the process is not optically transparent, and so wavelength information is lost. Additionally the delay involved in conversion and reconversion is significant. Furthermore, the process requires the provision of more capacity in the router to process the signals passing through. If, on the other hand, one remains in the optical domain employing amplitude shift keying (ASK), which is the preferred format for optical data transmission, then, while it is easy to convert a high level ASK bit to a low level one merely by gating, conversion in the opposite direction (low level to high level) requires the provision of a facility for injecting light into the system at the location of the conversion.

SUMMARY OF THE INVENTION

An object of the present invention is to provide a format of optical transmission network in which data packets, having a data-payload part and a non-payload that includes data packet routing information, can have their non-payload parts rewritten without having to have recourse to the use of an optical source at the location of such rewriting.

According to the present invention, there is provided an optical transmission network in which data packets, having a data-payload part and a non-payload that includes data packet routing information, are routed by an optical switch in different paths according to the routing information contained in the non-payload part of their respective data packets, and wherein the data-payload part of a data packet is transmitted as amplitude shift keying of an optical carrier while the non-payload part is transmitted as phase shift keying of the optical carrier.

Generally, but not necessarily always, the non-payload parts of such data packets take the form of data packet headers. There is thus no intrinsic reason why the non-payload parts of such data packets should not take the form of data packet footers.

Other features and advantages of the invention will be readily apparent from the following description of preferred embodiments of the invention, from the drawings and from the claims.

DETAILED DESCRIPTION OF PREFERRED EMBODIMENT

Figure 1:
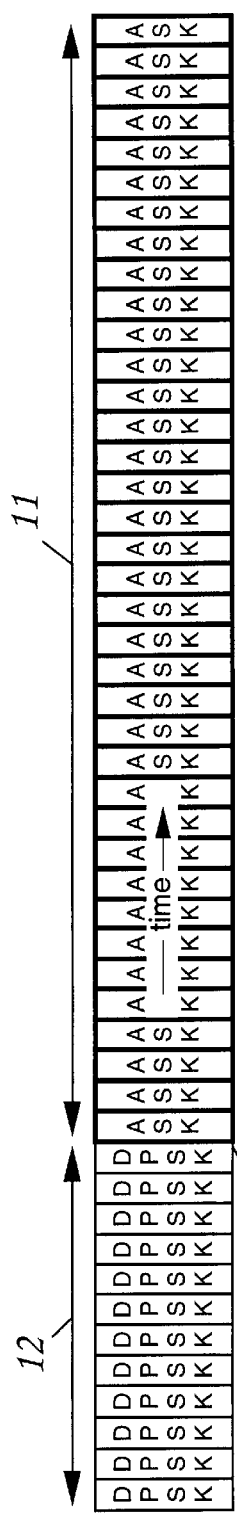
FIG. 1 is a schematic representation of a data packet.

Referring to FIG. 1, a data packet indicated generally at 10 comprises an intensity modulated (ASK) data payload part 11, preceded by a differential phase shift keyed (DPSK) header 12 that contains routing information.

Figure 2:
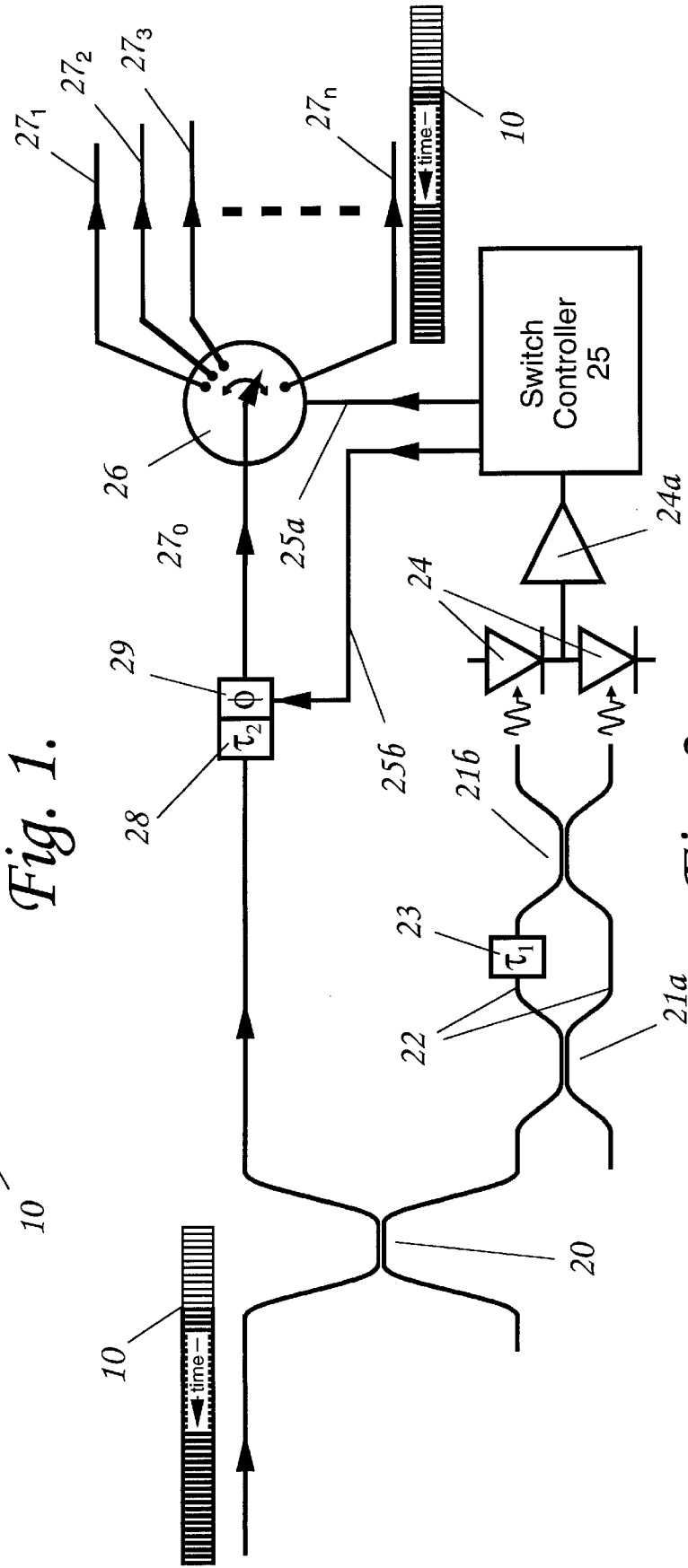
FIG. 2 is a schematic representation of a switch for routing data packets according to the present invention.

FIG. 2 schematically depicts a switch (router) employed in an optical transmission network using the data packets of FIG. 1. At the input of the switch, an optical tap 20 taps off a small proportion of the power of the received signal, and feeds the tapped power to a DPSK demodulator.

Advantageously this demodulator may comprise a Mach Zehnder interferometer, and this is followed by a differential optical detector to convert the demodulated optical header into an electrical analogue. The interferometer comprises a pair of 2×2 3 dB optical waveguide couplers 21a and 21b defining between them a pair of interference arms 22, one of which incorporates a delay 23 of magnitude $\tau_1$ which is equal to one DPSK bit period. The differential detector comprises a pair of photodiodes 24 followed by an amplifier 24a. The output of amplifier 24 a provides an input to a switch controller 25 that controls, via line 25a, the operation of an optical selector 26 directing an input to the selector 26 on line $27_0$ to a selected one on its n output lines $27_1$, $27_2$, $27_3$, . . . $27_n$. Optical line $27_0$ receives its input from the non-tapped output of tap 20 via a delay unit 28 that affords a delay of magnitude $\tau_2$ sufficient to delay the arrival of each data packet 10 until after the selector 26 has had time to be set by the controller 25 in response to the detected signal it has received from the DPSK demodulator in respect of that data packet.

A simple form of router having no facility for rewriting the DPSK headers 12 of data packets 10 may be modified to provide this facility by incorporating an active phase adjuster 29 with the passive delay unit 28. This phase adjuster 29 is controlled over line 25b from the switch controller to switch into optical line 27₀ an additional delay corresponding to a phase difference $\phi=\pi$ in synchronism with selected DPSK bits of the data packet 10 as it propagates through the delay unit 28.

Figure 3:
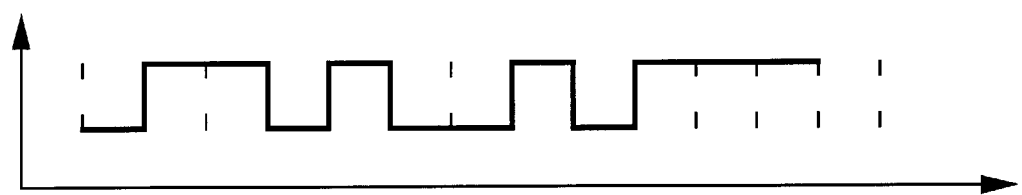
FIGS. 3 to 8 are DPSK waveforms in the switch of FIG. 2.
Figure 4:
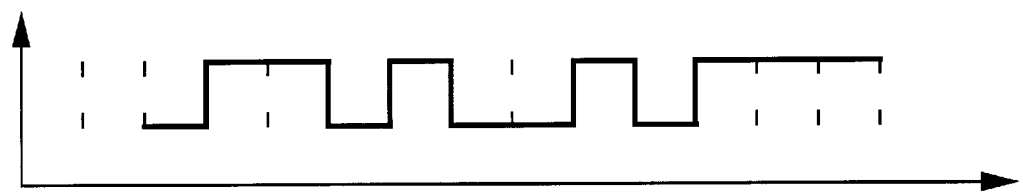
Figure 5:
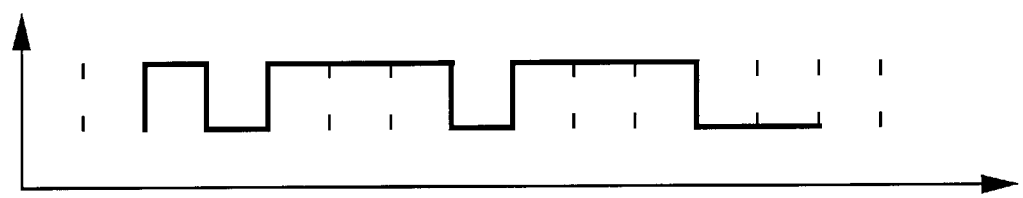

The total differential delay between the two interference arms 22 of the Mach Zehnder interferometer is such as to correspond to a phase difference substantially equal to $2N\pi$ or $2(n+1)\pi$, where N is an integer. This ensures that the output of the interferometer produced by the interference of DPSK bits is confined substantially exclusively to the output directed to one of the detectors 24, or to the other one, according to the phase of the DPSK data bit concerned. FIG. 3 depicts, as a function of time, the phase of an illustrative 12-bit DPSK header 12, while FIG. 4 depicts the same header delayed by one DPSK bit period. FIG. 5 depicts, as a function of time, the amplitude of the response of one of the photodetectors 24. (The amplitude of the response of the other photodetector 24 is the inverse of the waveform of FIG. 5.)

Figure 6:
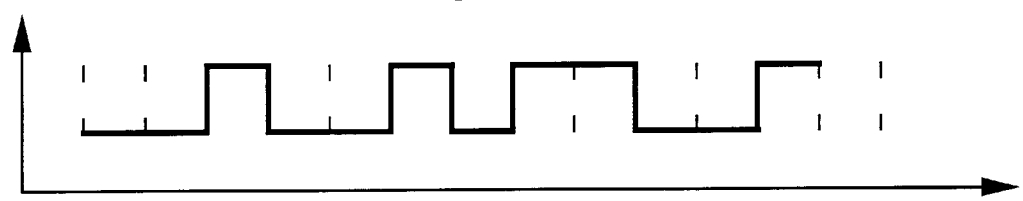
Figure 7:
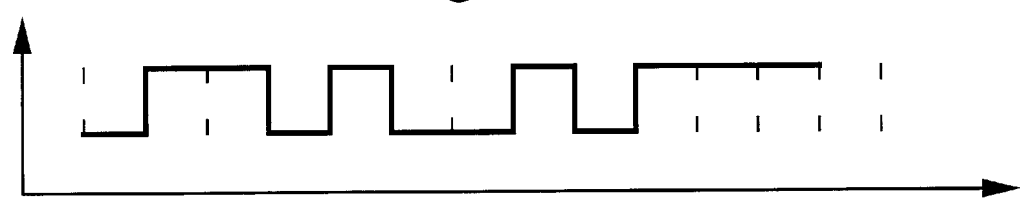
Figure 8:
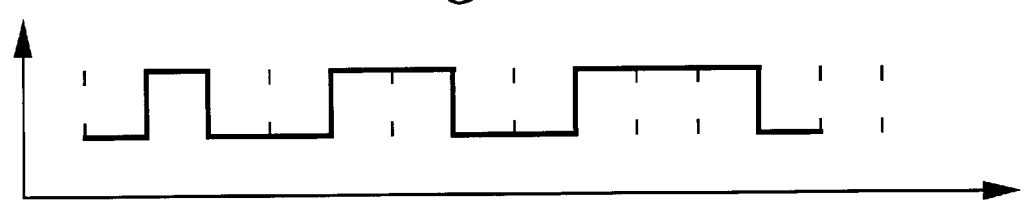

FIG. 6 depicts, as a function of time, an illustrative waveform applied over line 25b to control the operation of phase adjuster 29. The illustrative waveform of FIG. 6 is such as to produce phase inversion in bit periods 3, 6, 7, 8 and 11, and so will operate con the original DPSK header of FIG. 3, reproduced as FIG. 7, to provide the new header of FIG. 8.

Satisfactory operation of the switch of FIG. 2 requires tight control over the relative optical path lengths of the two interference arms 22 of the Mach Zehnder interferometer in relation to the wavelength of the incident light so as to avoid the phase quadrature condition in which the power of an incoming DPSK bit is divided substantially equally between the two photodetectors 24 irrespective of the phase state of that bit.

In circumstances in which such tight control is either impractical or for some other reason not desired, a possible solution to this problem is to arrange to preface each header with a phase reference preamble. Such a preamble can be a DPSK signal or a signal of known phase, for instance a signal whose phase is midway between the two phases of the ensuing DPSK header. Within the interferometer is included active phase lock circuitry, such as a fast phase modulator and fast phase locked loop (neither shown). An alternative solution that may be preferred, because it does not require the use of the preamble or of the fast phase modulator and phase locked loop, involves replacing with a phase diversity receiver. A phase diversity receiver is like a simple Mach Zehnder interferometer receiver to the extent that both types of receiver rely upon employing interference effects to measure phase; the phase diversity receiver is distinguished from the simple Mach Zehnder interferometer receiver in that the former relies upon simultaneously employing two different interference conditions for its measurement so that, whenever either one of these interference conditions assumes a phase quadrature relationship, then for the whole time that that relationship is maintained, the other phase relationship is maintained in a phase relationship that is necessarily not a phase quadrature relationship.

Figure 9:
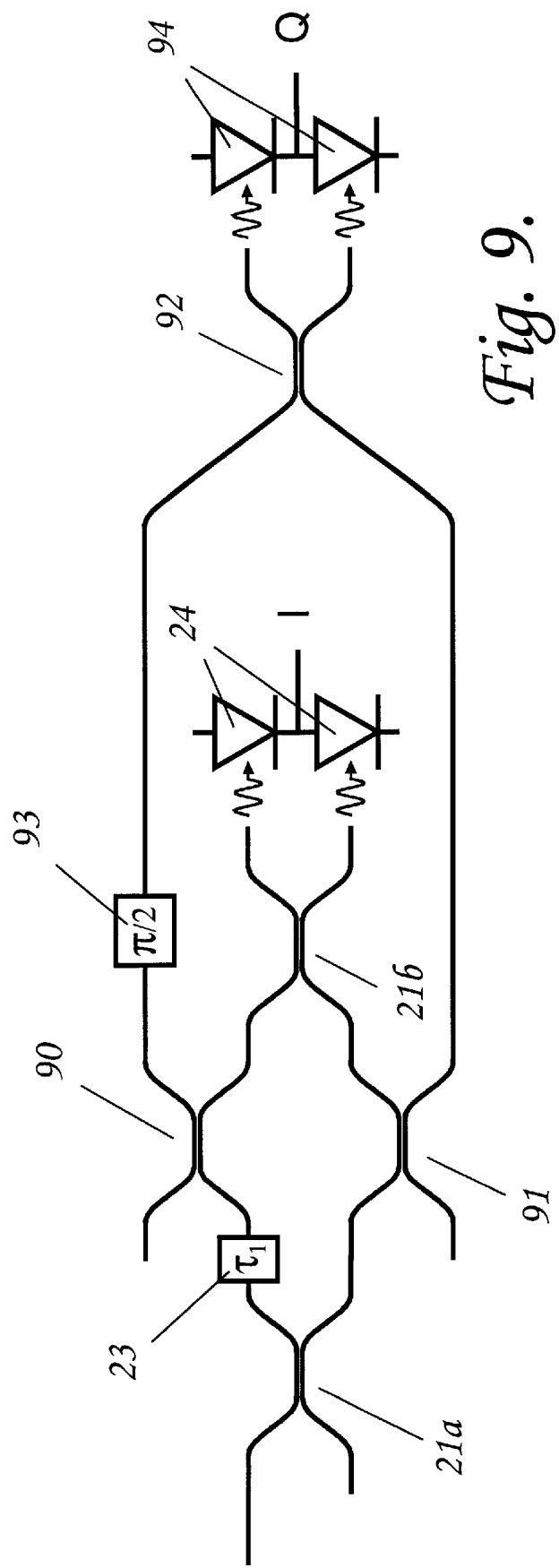
FIG. 9 is a phase diversity receiver modification of the switch of FIG. 2.

An example of a suitable phase diversity receiver is schematically depicted in FIG. 9. This diversity receiver uses all the components of the Mach Zehnder interferometer and differential detector of FIG. 2, and additionally includes three further 2×2 3 dB optical waveguide couplers 90, 91 and 92, a delay 93, and a further differential detector comprised by a pair of photodiodes 94. The magnitude of the delay 93 is such as to introduce a phase quadrature condition between the way in which power from the two interference arms 22 is interfered in coupler 21b and in coupler 92. Thus if the difference in optical path length, if any, between coupler 21b and couplers 90 and 91 corresponds to a phase angle $\alpha$, then the corresponding difference in optical path length, if any, between coupler 91 and couplers 90 and 91 corresponds to a phase angle $(\alpha+\pi/2)$. In appropriate circumstances, adjustment of the delay 93 to its required magnitude may conveniently be effected by irradiating a portion of one of the interference arms with a controlled amount of intense UV light.

If the phase condition is such that coupler 21b divides the light equally between the two photodiodes 24 for a DPSK bit of one data significance, then it will similarly divide the light equally for a DPSK bit of the other data significance. Designating the output of the differential amplifier 24 as the I output, then, under these conditions the magnitude of the voltage swing, $V_I$ produced by DPSK data bit significance transitions from this output is zero. On the other hand, this phase condition is also such that coupler 91 will apply the light substantially exclusively to just one of its diodes 94 for a DPSK bit of one data significance, and substantially exclusively to the other of its diodes 94 for a DPSK bit of the data significance. Designating the output of the differential amplifier 94 as the Q output, then, under these conditions the magnitude of the voltage swing, $V_Q$ produced by DPSK data bit significance transitions from this output is at its maximum value. Generalising from this, if the phase condition is changed by a phase angle $\theta$, then the voltage swings are given by $V_I=(V_I)_{max}\sin\theta$ and $V_Q=(V_Q)_{max}\cos\theta$. The I and Q output signals may then be processed to provide a demodulated DPSK output, $V_{output}$ as follows:

$$IF\ V_I \gg V_Q\ THEN\ V_{output} = V_I$$

$$IF\ V_I \ll V_Q\ THEN\ V_{output} = V_Q$$

$$IF\ V_I + V_Q > V_I - V_Q\ THEN\ V_{output} =$$

$$V_I + V_Q\ ELSE\ V_{output} = V_I + V_Q$$

This will always provide a demodulated output, though it will not distinguish between inverse DPSK sequences.

Figure 10:
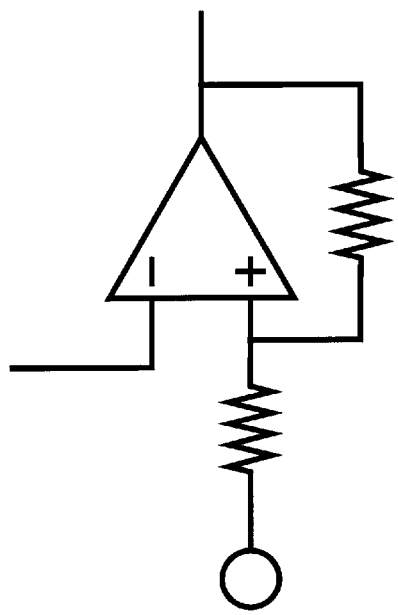
FIG. 10 is a schematic representation of a zero-crossing detector that is an optional component of the switch of FIG. 2.

A particular feature of using a DPSK header in conjunction with an ASK payload is that the DPSK format is readily distinguishable at a detector from the ASK format, and so neither part constrains the format of the other part. Thus for instance, a long sequence of data '0's or data '1's, if acceptable in the payload part of a data packet, can be tolerated by a detector of the headers of such packets. Such a sequence can be readily prevented from being spuriously interpreted at a detector of headers as part of a header by looking for zero-crossings. ASK data will produce modulation of the amplitudes of the outputs $V_I$ and $V_Q$, but will never produce a zero-crossing. Conversely, each data bit significance transition of a DPSK header produces a zero-crossing in either or both of the outputs $V_I$ and $V_Q$. Accordingly, a simple zero-crossing detector, for instance as schematically depicted in FIG. 10, can tap a signal from the output $V_{output}$ to provide an output employed to gate $V_{output}$ so as to prevent it from reaching switch controller 25 except when DPSK signals (headers) are specifically detected as being present.

Figure 11:
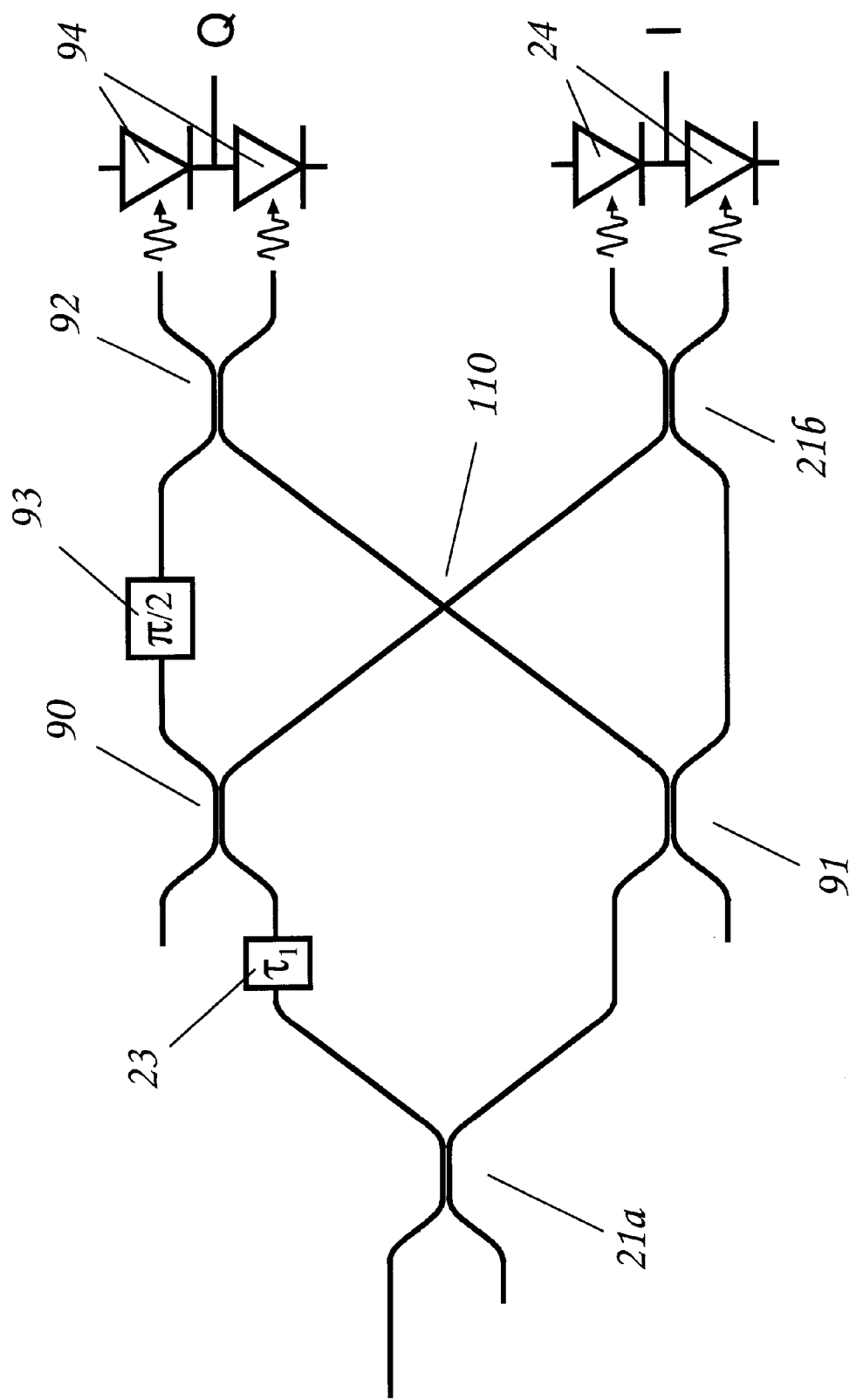
FIG. 11 depicts an alternative topology of a phase diversity receiver.

FIG. 11 depicts an alternative topology of phase diversity receiver, one whose configuration of waveguides can be implemented in a compact integrated waveguide (so-called planar waveguide) format by virtue of its inclusion of a 'level-crossing' type intersection 110 of waveguides. In such an intersection optical power launched into any one of its four component waveguides is coupled virtually exclusively into the opposite waveguide (i.e. virtually no power is coupled into either of the adjacent waveguides of the intersection).

What is claimed is:

1. An optical transmission network for routing data packets, the data packets each having a data-payload part and a non-payload part that includes data packet routing information, the network comprising:

an optical switch arranged to route the data packets in different paths according to the routing information contained in the respective data packets, and wherein the data-payload part of at least one of the data packets is transmitted as amplitude shift keying of an optical carrier while the non-payload part is transmitted as phase shift keying of the optical carrier.

2. An optical transmission network as claimed in claim 1, wherein the optical switch comprises:

a reader of data packet non-payload parts, the reader comprising a one bit differential delay optical interferometer feeding a photodetector.

3. An optical transmission network as claimed in claim 2, further comprising:

a logic unit controlling a phase shifter wherein an output of the reader is, fed to the logic unit and wherein the phase shifter is adapted to rewrite selected bits of the non-payload parts of data packets in response to signals from the logic unit.

4. An optical transmission network as claimed in claim 2, wherein the one bit differential delay optical interferometer is a phase diversity interferometer.

5. A method of routing data packets in an optical transmission network, the packets having a data-payload part and a non-payload that includes data packet routing information, the method comprising, at at least one optical switch in the network:

receiving a data packet;

routing the data packet onto a path according to the routing information contained in the non-payload part of their respective data packets, and wherein the data-payload part of at least one of the data packets is transmitted as amplitude shift keying of an optical carrier while the non-payload part is transmitted as phase shift keying of the optical carrier.

6. A method as claimed in claim 5, wherein the non-payload parts of the packets are read at the switches by readers employing one bit differential delay optical interferometry.

7. A method as claimed in claim 6, wherein the readers provide outputs which are applied to logic units controlling phase shifters which rewrite, in response to signals from the logic units, selected bits of the non-payload parts of data packets.

8. A method as claimed in claim 6, wherein the readers employing one bit differential delay optical interferometry are phase diversity interferometers.

9. Apparatus for use in a communications network, for modifying non-payload parts of data transmitted across the network, the non-payload parts being transmitted as phase shift keying of an optical carrier, and the payload parts being transmitted as amplitude shift keying of an optical carrier; the apparatus comprising:

reading means for reading the non-payload parts of the data, and a phase shifter, for adjusting the phase of at least some of the phase shifted keyed non-payload part and to reunite this part, in response to an output of the reading means with respective amplitude shift keyed payload parts.

10. A communications router for routing data packets in a communications network, the router comprising:

an optical receiver arranged to receive data packets, each of the data packets comprising an amplitude shift keyed data-payload part and a phase shift keyed non-payload part, wherein the non-payload part carries data packet routing information;

means for reading the data packet routing information, and an optical switch for switching each of the data packets according to the data packet routing information carried within said data packets, while maintaining at least the data-payload part within in the optical domain.

11. A communications router according to claim 10, in which the optical switch comprises a reader of data packet non-payload parts, the reader comprising:

a one bit differential delay optical interferometer; and a photodetector arranged to receive an output from the interferometer.

12. A communications router according to claim 11, in which the output from the reader is fed to a logic unit controlling a phase shifter, the phase shifter being adapted to rewrite selected bits of the non-payload parts of data packets responsive to signals output from the logic unit.

13. A communications router according to claim 11, in which the one bit differential delay optical interferometer is a phase diversity interferometer.

14. A communications network comprising:

a communications router according to claim 10, a plurality of network paths coupled to the communications router;

wherein the switch of the communications router is arranged to route the data packets onto the network paths.

15. An optical transmitter apparatus for transmitting data packets in a communications network, each of the data packets comprising a data-payload part and a non-payload part, and wherein the non-payload part carries data packet routing information, the transmitter comprising:

first means arranged to transmit the data-payload part using amplitude shift keying;

second means arranged to transmit the non-payload part using phase shift keying.

16. An optical receiver apparatus for receiving data packets in a communications network, each of the data packets comprising an amplitude shift keyed data-payload part and a phase shift keyed non-payload part, and wherein the non-payload part carries data packet routing information, the transmitter comprising:

first means arranged to receive the data-payload part using amplitude shift keying;

second means arranged to transmit the non-payload part using phase shift keying.

17. A method of optically modulating a data signal in a communications network, the data signal comprising a data packet comprising a data-payload part and a non-payload part, wherein the non-payload part carries data packet routing information, the method comprising the steps of:

amplitude shift key modulating the data-payload part; and phase shift key modulating the non-payload part.

18. A method of routing a data signal in an optical communications network node, the data signal comprising at least one data packet comprising an amplitude shift keyed data-payload part and a phase shift keyed non-payload part, wherein the non-payload part carries data packet routing information, the method comprising the steps of:

receiving each data packet;

demodulating only the non-payload part of each data packet;

forwarding each data packet responsive to the data packet routing information in the non-payload part of each data packet.

19. A method according to claim 18 further comprising the step of:

modifying the non-payload part of at least one of the data packets.

20. A method according to claim 19 in which the step of modifying comprises the step of:

modifying the data packet routing information in at least one of the data packets.

21. A method of routing data packets in an optical transmission network comprising at least one optical switch, the data packets have a data-payload part and a non-payload, the non-payload part comprising data packet routing information, the method comprising:

routing the data packets, by means of the at least one optical switch, onto different paths according to the data packet routing information contained in the non-payload part of respective data packets, and wherein the data-payload part of the data packet is transmitted as amplitude shift keying of an optical carrier while the non-payload part is transmitted as phase shift keying of the optical carrier.

22. A method according to claim 21 in which only the non-payload part of the data packets is demodulated at the switch.

23. A method according to claim 21, in which the non-payload parts of the packets are read at the switches by readers employing one bit differential delay optical interferometry.

24. A method according to claim 23, in which the readers provide outputs which are applied to logic units controlling phase shifters which rewrite, in response to signals from the logic units, selected bits of the non-payload parts of the data packets.

25. A method as claimed in claim 24, wherein the readers employing one bit differential delay optical interferometry are phase diversity interferometers.

\* \* \* \* \*